United States Patent
Chen et al.

(10) Patent No.: US 12,039,281 B2
(45) Date of Patent: Jul. 16, 2024

(54) METHOD AND SYSTEM FOR PROCESSING SENTENCE, AND ELECTRONIC DEVICE

(71) Applicants: Beijing JingDong ShangKe Information Technology Co., Ltd., Beijing (CN); Beijing Jingdong Century Trading Co., Ltd., Beijing (CN)

(72) Inventors: Hongshen Chen, Beijing (CN); Shuman Liu, Beijing (CN); Zhaochun Ren, Beijing (CN); Dawei Yin, Beijing (CN); Yihong Zhao, Beijing (CN)

(73) Assignees: Beijing JingDong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 605 days.

(21) Appl. No.: 17/263,836

(22) PCT Filed: Jul. 18, 2019

(86) PCT No.: PCT/CN2019/096524
§ 371 (c)(1),
(2) Date: Jan. 27, 2021

(87) PCT Pub. No.: WO2020/020041
PCT Pub. Date: Jan. 30, 2020

(65) Prior Publication Data
US 2022/0215177 A1    Jul. 7, 2022

(30) Foreign Application Priority Data
Jul. 27, 2018    (CN) .......................... 201810851273.5

(51) Int. Cl.
*G06F 40/35*    (2020.01)
*G06F 40/56*    (2020.01)
(Continued)

(52) U.S. Cl.
CPC .............. *G06F 40/35* (2020.01); *G06F 40/56* (2020.01); *G06N 3/045* (2023.01); *G06N 5/04* (2013.01)

(58) Field of Classification Search
CPC ......... G06F 40/35; G06F 40/56; G06N 3/045; G06N 5/04
See application file for complete search history.

(56) References Cited

U.S. PATENT DOCUMENTS

2017/0262783 A1    9/2017   Franceschini et al.
2018/0144385 A1*   5/2018   Subramanya ............ G06N 3/08
(Continued)

FOREIGN PATENT DOCUMENTS

CA    3040165 A1 *  5/2018   ............ G06F 40/30
CN    106649786       5/2017
(Continued)

OTHER PUBLICATIONS

Sutskever, Ilya, James Martens, and Geoffrey E. Hinton. "Generating text with recurrent neural networks." Proceedings of the 28th international conference on machine learning (ICML-11). (Year: 2011).*

(Continued)

*Primary Examiner* — Daniel C Washburn
*Assistant Examiner* — Oluwadamilola M Ogunbiyi
(74) *Attorney, Agent, or Firm* — HSML P.C.

(57) ABSTRACT

The present disclosure provides a method for processing sentence, including: determining a vector representation of a sentence to be processed; inputting the vector representation of the sentence to be processed to a first recurrent neural (Continued)

network, and updating a state of a hidden layer of the first recurrent neural network as a vector representation of a historical dialogue, wherein, if a processed sentence exists, the state of the hidden layer of the first recurrent neural network is related to the processed sentence; determining a knowledge vector related to the sentence to be processed; and generating a reply sentence based on the vector representation of the historical dialogue and the knowledge vector. The present disclosure further provides a system for processing sentence, an electronic device, and a computer-readable medium.

20 Claims, 7 Drawing Sheets

(51) Int. Cl.
*G06N 3/045* (2023.01)
*G06N 5/04* (2023.01)

(56) References Cited

U.S. PATENT DOCUMENTS

| | | | | |
|---|---|---|---|---|
| 2018/0189274 A1* | 7/2018 | Noh | | G06N 3/047 |
| 2018/0329884 A1* | 11/2018 | Xiong | | G06N 3/044 |
| 2019/0065506 A1* | 2/2019 | Li | | G06N 3/042 |
| 2019/0163735 A1* | 5/2019 | Xu | | G06N 3/084 |
| 2019/0228070 A1* | 7/2019 | Lu | | G06N 3/044 |
| 2019/0294874 A1* | 9/2019 | Orlov | | G06N 3/084 |
| 2020/0134263 A1* | 4/2020 | Oh | | G06N 3/045 |
| 2020/0151207 A1* | 5/2020 | Andrassy | | G06F 16/3347 |

FOREIGN PATENT DOCUMENTS

| | | | | |
|---|---|---|---|---|
| CN | 106897263 | | 6/2017 | |
| CN | 107193978 | | 9/2017 | |
| CN | 107562863 | | 1/2018 | |
| CN | 107885756 | | 4/2018 | |
| CN | 108304437 | | 7/2018 | |
| CN | 108549644 A | * | 9/2018 | G06F 40/42 |
| CN | 108985370 A | * | 12/2018 | G06K 9/6211 |
| CN | 109062910 A | * | 12/2018 | |
| CN | 107844469 B | * | 6/2020 | G06F 16/332 |
| JP | 2018060364 A | * | 4/2018 | G06F 16/00 |
| WO | WO-2018214486 A1 | * | 11/2018 | G06F 16/345 |
| WO | WO-2019174450 A1 | * | 9/2019 | |

OTHER PUBLICATIONS

Ke, Pei, et al. "Generating informative responses with controlled sentence function." Proceedings of the 56th Annual Meeting of the Association for Computational Linguistics (vol. 1: Long Papers). 2018. (Year: 2018).*

Extended European Search Report, issued in the corresponding European Patent Application No. 19841623.2, dated Aug. 16, 2021, 9 pages.

International Search Report and Written Opinion, issued in the corresponding PCT application No. PCT/CN2019/096524, dated Oct. 24, 2019, 14 pages.

First Chinese Office Action, issued in the regarding the corresponding Chinese patent application No. CN201810851273.5, dated Jul. 14, 2023, 7 pages.

Liu et al., "Knowledge Diffusion for Neural Dialogue Generation", Proceedings of the 56th Annual Meeting of the Association for Computational Linguistics (Long Papers), Jul. 15-20, 2018, pp. 1489-1498.

* cited by examiner

METHOD AND SYSTEM FOR PROCESSING SENTENCE, AND ELECTRONIC DEVICE

CROSS-REFERENCE TO RELATED APPLICATION

This application is a Section 371 National Stage Application of International Application No. PCT/CN2019/096524, filed on Jul. 18, 2019, entitled "METHOD AND SYSTEM FOR PROCESSING SENTENCE, AND ELECTRONIC DEVICE", which claims priority to the Chinese Patent Application No. 201810851273.5, filed on Jul. 27, 2018, which is incorporated herein by reference in its entirety.

TECHNICAL FIELD

The present disclosure relates to a field of computer technology, and in particular to a method and a system for processing sentence, and an electronic device.

BACKGROUND

With a development of e-commerce, e-commerce platforms have undertaken after-sales needs about related products. However, with a development of business and an increase in a number of online shopping users, a traditional manual customer service model has been difficult to adapt to the after-sales needs of massive e-commerce users. It also brings a huge burden of labor costs to enterprises.

In order to solve this phenomenon, a shopping guide service based on a nature of voice dialogue came into being, that is, a dialogue generation system is introduced to more accurately capture shopping needs of users through training machine learning models, and to dynamically understand changes in user needs. By simulating dialogue modes of natural persons, guiding and helping users to complete shopping behaviors on e-commerce websites and improving various after-sales services.

In a process of implementing the present disclosure, the inventor found that there are at least the following problems in the related art: an existing dialogue generation model, due to lack of background knowledge about dialogue content, cannot effectively generate corresponding replies, or often generates universal replies that are unrelated to the dialogue content, such as "Ha, ha" and "I don't know", hinders improving the efficiency of the dialogue generation system.

SUMMARY

In view of this, the present disclosure provides a method and a system for processing sentence, and an electronic device.

An aspect of the present disclosure provides a method for processing sentence, comprising: determining a vector representation of a sentence to be processed; inputting the vector representation of the sentence to be processed to a first recurrent neural network, and updating a state of a hidden layer of the first recurrent neural network as a vector representation of a historical dialogue, wherein, if a processed sentence exists, the state of the hidden layer of the first recurrent neural network is related to the processed sentence; determining a knowledge vector related to the sentence to be processed; and generating a reply sentence based on the vector representation of the historical dialogue and the knowledge vector.

According to an embodiment of the present disclosure, the determining a vector representation of the sentence to be processed comprises: converting words in the sentence to be processed into word vectors; and inputting the word vectors to a second recurrent neural network in order, and obtaining a state of a hidden layer of the second recurrent neural network as a vector representation of the sentence to be processed, wherein the state of the hidden layer of the second recurrent neural network is unrelated to the processed sentence.

According to an embodiment of the present disclosure, the determining a knowledge vector related to the sentence to be processed comprises: determining a plurality of candidate entries related to the sentence to be processed; determining candidate entry vectors of the candidate entries; determining a correlation coefficient between each candidate entry vector and the vector representation of the sentence to be processed; and determining the knowledge vector based on the correlation coefficients and the candidate entry vectors.

According to an embodiment of the present disclosure, the determining a knowledge vector related to the sentence to be processed comprises: determining a plurality of candidate entries related to the sentence to be processed; determining candidate entry vectors of the candidate entries; determining a correlation coefficient between each candidate entry vector and the vector representation of the historical dialogue; and determining the knowledge vector based on the correlation coefficients and the candidate entry vectors.

According to an embodiment of the present disclosure, the determining a plurality of candidate entries related to the sentence to be processed comprises at least one of the following: determining candidate entries that match the sentence to be processed; determining candidate entries that are similar to entity content in the sentence to be processed; or if a processed sentence exists, determining candidate entries related to the processed sentence.

According to an embodiment of the present disclosure, the method further comprises: ignoring a part of the candidate entries in a case that a number of the candidate entries exceeds a preset number.

According to an embodiment of the present disclosure, the generating a reply sentence based on the vector representation of the historical dialogue and the knowledge vector comprises: inputting the vector representation of the historical dialogue, the knowledge vector, and a word vector of a previously predicted word to a third recurrent neural network, determining a currently predicted word based on a state of a hidden layer of the third recurrent neural network, and performing above operations repeatedly until a complete reply sentence is generated, wherein: the state of the hidden layer of the third recurrent neural network is unrelated to the processed sentence; and if no previously predicted word exists, a default start symbol is used as the previously predicted word.

Another aspect of the present disclosure provides a system for processing sentence, comprising: a sentence to be processed vector determination module, a historical dialogue vector determination module, a knowledge vector determination module, and a reply sentence generation module. The sentence to be processed vector determination module is configured to determine a vector representation of a sentence to be processed. The historical dialogue vector determination module is configured to input the vector representation of the sentence to be processed to a first recurrent neural network, and update a state of a hidden layer of the first recurrent neural network as a vector representation of a historical dialogue, wherein, if a processed sentence exists, the state of the hidden layer of the first recurrent neural network is related to the processed sentence. The knowledge vector determination module is configured to determine a knowledge vector related to the sentence to be processed. The reply sentence generation module is configured to generate a reply sentence based on the vector representation of the historical dialogue and the knowledge vector.

According to an embodiment of the present disclosure, the sentence to be processed vector determination module comprises: a word vector conversion sub-module and a sentence to be processed vector determination sub-module. The word vector conversion sub-module is configured to convert words in the sentence to be processed into word vectors. The sentence to be processed vector determination sub-module is configured to input the word vectors into a second recurrent neural network in order, and obtain a state of a hidden layer of the second recurrent neural network as a vector representation of the sentence to be processed, wherein the state of the hidden layer of the second recurrent neural network is unrelated to the processed sentence.

According to an embodiment of the present disclosure, the knowledge vector determination module comprises: a candidate entry determination sub-module, a candidate entry vector determination sub-module, a correlation coefficient determination sub-module, and a knowledge vector determination sub-module. The candidate entry determination sub-module is configured to determine a plurality of candidate entries related to the sentence to be processed. The candidate entry vector determination sub-module is configured to determine candidate entry vectors of the candidate entries. The correlation coefficient determination sub-module is configured to determine a correlation coefficient between each candidate entry vector and the vector representation of the sentence to be processed, or determine a correlation coefficient between each candidate entry vector and the vector representation of the historical dialogue. The knowledge vector determination sub-module is configured to determine the knowledge vector based on the correlation coefficients and the candidate entry vectors.

According to an embodiment of the present disclosure, the candidate entry determination sub-module comprises at least one of the following: a first determination unit, a second determination unit, or a third determination unit. The first determination unit is configured to determine candidate entries that match the sentence to be processed. The second determination unit is configured to determine candidate entries that are similar to entity content in the sentence to be processed. The third determination unit is configured to that: if a processed sentence exists, determining candidate entries related to the processed sentence.

According to an embodiment of the present disclosure, the system further comprises: an ignoring sub-module configured to ignore a part of the candidate entries in a case that a number of the candidate entries exceeds a preset number.

According to an embodiment of the present disclosure, the reply sentence generation module comprises: a recycle sub-module configured to input the vector representation of the historical dialogue, the knowledge vector, and a word vector of a previously predicted word to a third recurrent neural network, and determine a currently predicted word based on a state of a hidden layer of the third recurrent neural network, and perform above operations repeatedly until a complete reply sentence is generated, wherein: the state of the hidden layer of the third recurrent neural network is unrelated to the processed sentence; and if no previously predicted word exists, a default start symbol is used as the previously predicted word.

Another aspect of the present disclosure provides an electronic device comprising: one or more processors; and one or more memories configured to store one or more computer readable instructions, wherein when one or more computer readable instructions are executed by one or more processors, the one or more processors are configured to implement the method described above.

Another aspect of the present disclosure provides a computer-readable medium having computer readable instructions stored thereon, which when executed by a processor causes the processor to implement the method described above.

Another aspect of the present disclosure provides a computer program having computer executable instructions, which when executed by a processor causes the processor to implement the method described above.

BRIEF DESCRIPTION OF THE DRAWINGS

Through the following description of the embodiments of the present disclosure with reference to the accompanying drawings, the above and other objectives, features, and advantages of the present disclosure will be more apparent. In the accompanying drawings.

DETAILED DESCRIPTION OF EMBODIMENTS

Figure 1:
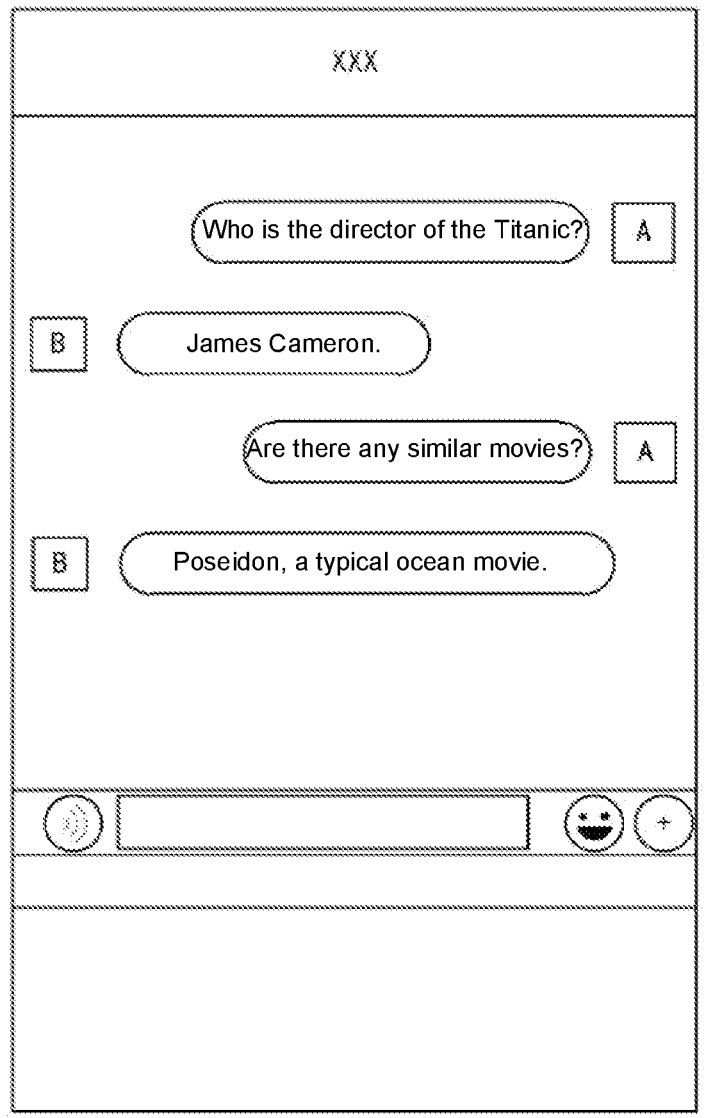
FIG. 1 schematically shows an application scenario of a method for processing sentence according to an embodiment of the present disclosure.

Hereinafter, embodiments of the present disclosure will be described with reference to the drawings. However, it should be understood that these descriptions are only exemplary and are not intended to limit a scope of the present disclosure. In the following detailed description, for ease of explanation, many specific details are set forth to provide a comprehensive understanding of the embodiments of the present disclosure. However, obviously, one or more embodiments may also be implemented without these specific details. In addition, in the following description, descriptions of well-known structures and technologies are omitted to avoid unnecessarily obscuring a concept of the present disclosure.

The terms used here are only for describing specific embodiments, and are not intended to limit the present disclosure. The terms "comprising", "including", etc. used herein indicate existence of the described features, steps, operations and/or components, but do not exclude existence or addition of one or more other features, steps, operations or components.

All terms (comprising technical and scientific terms) used herein have the meanings commonly understood by those skilled in the art, unless otherwise defined. It should be noted that the terms used here should be interpreted as having meanings consistent with the context of this specification, and should not be interpreted in an idealized or overly rigid manner.

In a case of using an expression similar to "at least one of A, B and C, etc.", generally speaking, it should be interpreted according to the meaning of the expression commonly understood by those skilled in the art (for example, "a system having at least one of A, B and C" shall comprise, but not limited to, a system having A alone, a system having B alone, a system having C alone, a system having A and B, a system having A and C, a system having B and C, and/or a system having A, B, C, etc.) In a case of using an expression similar to "at least one of A, B or C, etc.", generally speaking, it should be interpreted according to the meaning of the expression commonly understood by those skilled in the art (for example, "a system having at least one of A, B or C" shall comprise, but not limited to, a system having A alone, a system having B alone, a system having C alone, a system having A and B, a system having A and C, a system having B and C, and/or a system having A, B, C, etc.) It should be understood by those skilled in the art that any transitional conjunctions and/or phrases representing two or more optional items, whether in the description, claims or accompanying drawings, should essentially be understood to give possibilities of comprising one of these items, any of these items, or two of these items. For example, the phrase "A or B" should be understood to give possibilities of comprising "A" or "B", or "A and B".

An embodiment of the present disclosure provides a method for processing sentence, including: determining a vector representation of a sentence to be processed; inputting the vector representation of the sentence to be processed to a first recurrent neural network, and updating a state of a hidden layer of the first recurrent neural network as a vector representation of a historical dialogue, where if a processed sentence exists, the state of the hidden layer of the first recurrent neural network is related to the processed sentence; determining a knowledge vector related to the sentence to be processed; and generating a reply sentence based on the vector representation of the historical dialogue and the knowledge vector.

FIG. 1 schematically shows an application scenario of a method for processing sentence according to an embodiment of the present disclosure.

As shown in FIG. 1, user A may have a dialogue with dialogue generation system B. User A enters a sentence "Who is the director of the Titanic?", the dialogue generation system B may generate a reply sentence of "James Cameron". When the user A continues to ask "Are there any similar movies?", the dialogue generation system B may generate reply sentences such as "Poseidon, a typical ocean movie".

In the related art, the dialogue generation system may be realized by a neural network. Through a large amount of corpus training, certain background knowledge may be mastered, so that a satisfactory reply sentence may be generated in some cases. However, if untrained content is encountered, it is difficult to generate a reply sentence that meets requirements.

Therefore, if an amount of knowledge of the dialogue generation system is to be improved, it needs to be continuously trained. This may cause overtraining problems, and satisfactory results may not be obtained.

To this end, the embodiments of the present disclosure provide a knowledge base-based dialogue generation system, which may capture required knowledge from the knowledge base without training knowledge content to solve the above-mentioned problems.

Figure 2:
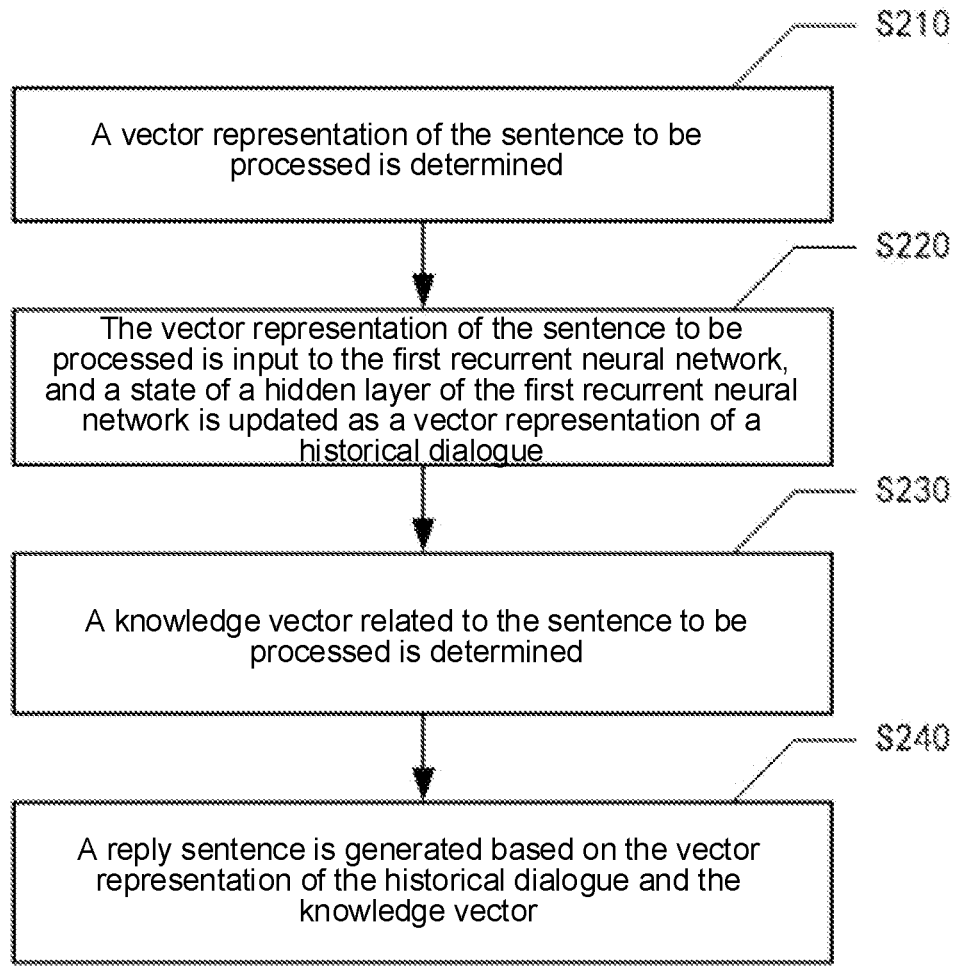
FIG. 2 schematically shows a flowchart of a method for processing sentence according to an embodiment of the present disclosure.

FIG. 2 schematically shows a flowchart of a method for processing sentence according to an embodiment of the present disclosure.

As shown in FIG. 2, the method includes operations S210 to S240.

In operation S210, a vector representation of the sentence to be processed is determined.

In operation S220, the vector representation of the sentence to be processed is input to the first recurrent neural network, and a state of a hidden layer of the first recurrent neural network is updated as a vector representation of a historical dialogue. If a processed sentence exists, the state of the hidden layer of the first recurrent neural network is related to the processed sentence.

In operation S230, a knowledge vector related to the sentence to be processed is determined.

In operation S240, a reply sentence is generated based on the vector representation of the historical dialogue and the knowledge vector.

With this method, a defect of lacking background knowledge may be overcome by using a knowledge vector, such that better reply sentences can be generated, avoiding meaningless replies and improving user experience.

The operation S210 of the embodiment of the present disclosure will be introduced in the following with reference to FIG. 3.

Figure 3:
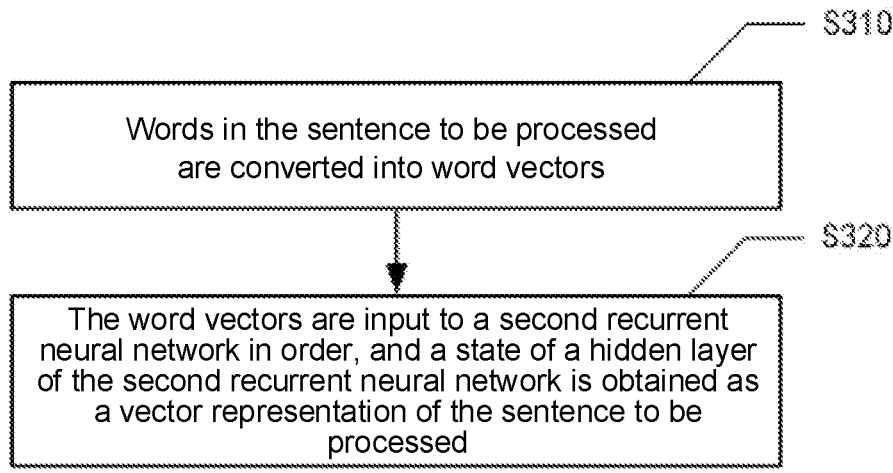
FIG. 3 schematically shows a flowchart of determining a vector representation of a sentence to be processed according to an embodiment of the present disclosure.

FIG. 3 schematically shows a flowchart of determining a vector representation of a sentence to be processed according to an embodiment of the present disclosure.

As shown in FIG. 3, the method includes operations S310 and S320.

In operation S310, words in the sentence to be processed are converted into word vectors. The conversion may be performed by a certain algorithm, for example, it may be CBOW (Continuous Bag-of-word Model), or other algorithms. In this way, different words are converted into different word vectors, and the words with similar semantics have similarity in the converted word vectors.

In operation S320, the word vectors are input to a second recurrent neural network in order, and a state of a hidden layer of the second recurrent neural network is obtained as a vector representation of the sentence to be processed, where the state of the hidden layer of the second recurrent neural network has nothing to do with processed sentences.

According to an embodiment of the present disclosure, the second recurrent neural network may also be called an encoder recurrent neural network, and is configured to convert the sentence to be processed into a vector form. Each time the neural network processes a new sentence to be processed, the hidden layer is initialized to ensure that the sentences may not affect each other and the independence of conversion.

According to an embodiment of the present disclosure, the method first segmentation of the sentence to be processed, then converts each word into a word vector, and sequentially inputs each word vector into the initialized second recurrent neural network. After each input, the hidden layer of the second recurrent neural network is updated until the last word vector is processed, and the state of the hidden layer of the second recurrent neural network is taken as the vector representation of the sentence to be processed.

Referring back to FIG. 2, in operation S220, according to an embodiment of the present disclosure, the first recurrent neural network may also be referred to as a text recurrent neural network, which is configured to quote the processed sentence to obtain a vector representation of the historical dialogue. Each time the sentence to be processed is processed, the vector representation of the sentence to be processed is input into the first recurrent neural network, and a state of a hidden layer of the first recurrent neural network is updated. For example, when obtaining a sentence to be processed "Who is the director of the Titanic?", inputting the corresponding vector representation to the first recurrent neural network, updating the state of the hidden layer of the first recurrent neural network, and temporarily call it the first hidden layer state; when obtaining "Are there any similar movies?", the state of the hidden layer of the first recurrent neural network is the first hidden layer state, and a vector representation corresponding to "Are there any similar movies?" is input to the first recurrent neural network, and the state of the hidden layer of the first recurrent neural network is updated from the first hidden layer state to a second hidden layer state. The first hidden layer state is used as a vector representation of the historical dialogue when processing the sentence of "Who is the director of Titanic?", and the second hidden layer state is used as a vector representation of the historical dialogue when processing the sentence of "Are there any similar movies?". The neural network does not initialize the hidden layer before processing each sentence to be processed, so that information in the processed sentence may be referenced when generating a reply sentence.

Figure 4:
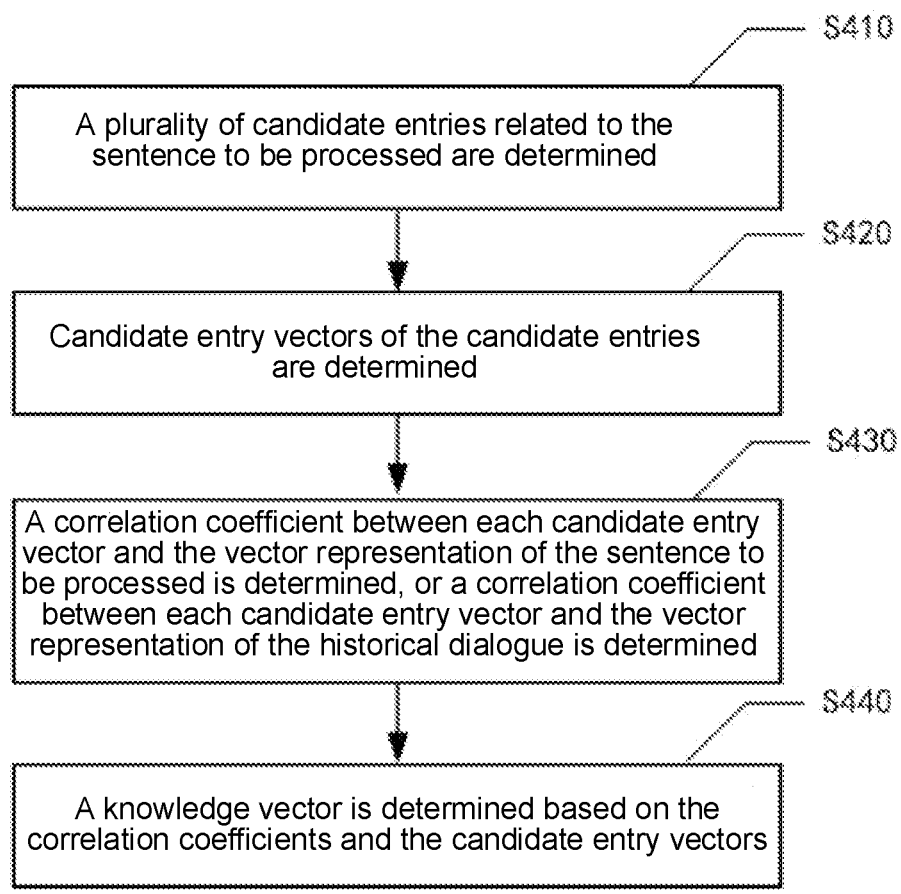
FIG. 4 schematically shows a flowchart of determining a knowledge vector related to a sentence to be processed according to an embodiment of the present disclosure.

Next, referring to FIG. 4, operation S230 of the embodiment of the present disclosure will be introduced.

FIG. 4 schematically shows a flowchart of determining a knowledge vector related to the sentence to be processed according to an embodiment of the present disclosure.

As shown in FIG. 4, the method includes operations S410 to S440.

In operation S410, a plurality of candidate entries related to the sentence to be processed are determined.

According to an embodiment of the present disclosure, S410 may include the following several implementation manners, which are respectively introduced below.

According to an embodiment of the present disclosure, the determining a plurality of candidate entries related to the sentence to be processed includes determining candidate entries that match the sentence to be processed. For example, for the sentence to be processed "Who is the director of the Titanic?", the entity content "Titanic" may be extracted, and related candidate entries may be searched in the knowledge base based on the entity content, see Table 1. Since the sentence to be processed contains "director", the candidate entry for the director of "Titanic" has a higher score.

TABLE 1

| Entity | Relationship | Entity | Score |
| --- | --- | --- | --- |
| Titanic | — | — | 0.001 |
| Titanic | Release time | 1997 | 0.001 |
| Titanic | Director | James Cameron | 1 |
| Titanic | Actor | Leonardo DiCaprio | 0.001 |
| Titanic | Actor | Kate Winslet | 0.001 |
| Titanic | Actor | Billy Zane | 0.001 |
| ... | ... | ... | ... |

According to an embodiment of the present disclosure, the determining a plurality of candidate entries related to the sentence to be processed includes determining candidate entries that are similar to the entity content in the sentence to be processed. The method is extended based on the entity content of the sentence to be processed, and more relevant background knowledge may be obtained. For example, similar candidate entries for "Titanic" are shown in Table 2.

TABLE 2

| Entity | Score |
| --- | --- |
| ... | ... |
| Broken Soul Blue Bridge | 0.1 |
| Diary of the Evil Child | 0.05 |
| Poseidon | 0.15 |
| Resident Evil | 0.001 |
| ... | ... |

According to an embodiment of the present disclosure, the determining a plurality of candidate entries related to the sentence to be processed includes, in a case that a processed sentence exists, determining candidate entries related to the processed sentence. This method may retain the candidate entries of the processed sentences to a certain extent, so that the knowledge vector has a certain memory.

For example, when obtaining the sentence to be processed "Are there any similar movies?", the candidate entries obtained last time may be retained, such as the candidate entries related to "Titanic", or the search may be based on the previous content. For example, searching for candidate entries related to "James Cameron". Table 3 schematically shows the plurality of candidate entries obtained when processing "Are there any similar movies?"

TABLE 3

| Entity | Relationship | Entity | Score |
| --- | --- | --- | --- |
| Titanic | — | — | 0.75 |
| James Cameron | — | — | 0.05 |
| Titanic | Release time | 1997 | 0.001 |
| Titanic | Director | James Cameron | 0.001 |
| Titanic | Actor | Leonardo DiCaprio | 0.001 |
| Titanic | Actor | Kate Winslet | 0.001 |
| ... | ... | ... | ... |

Similarly, there may also be candidate entries similar to the entity content, see Table 4.

TABLE 4

| Entity | Score |
| --- | --- |
| ... | ... |
| Broken Soul Blue Bridge | 0.85 |
| Diary of the Evil Child | 0.45 |
| Poseidon | 0.95 |
| Resident Evil | 0.05 |
| ... | ... |

Thus, a reply sentence of "Poseidon, a typical ocean movie" as shown in FIG. 1 may be generated.

According to an embodiment of the present disclosure, the method further includes ignoring a part of the candidate entries when a number of the candidate entries exceeds a preset number. This method may improve the processing efficiency when the number of candidate entries obtained is large. For example, a preset number n may be set. When the number of candidate entries exceeds the preset number n, the top n candidate entries with the highest scores are obtained, and other candidate entries are ignored, and the score is a score of the relevance to the current context determined when the candidate entry is obtained.

Refer back to FIG. 4. In operation S420, a candidate entry vector of the candidate entry is determined.

In operation S430, a correlation coefficient between each candidate entry vector and the vector representation of the sentence to be processed is determined, or a correlation coefficient between each candidate entry vector and the vector representation of the historical dialogue is determined. For example, a correlation coefficient between two vectors may be calculated by a method of cosine similarity. Here, a correlation coefficient between the candidate entry vector and the vector representation of the sentence to be processed may be calculated, and a correlation coefficient between the candidate entry vector and the vector representation of the historical dialogue may also be calculated.

In operation S440, a knowledge vector is determined based on the correlation coefficient and the candidate entry vector. For example, the knowledge vector is determined by multiplying the correlation coefficient and the candidate entry vector and then summing.

This method processes candidate entry vectors based on correlation coefficients, and the generated knowledge vectors are more targeted.

Referring back to FIG. 2, according to an embodiment of the present disclosure, in operation S240, the generating a reply sentence based on the vector representation of the historical dialogue and the knowledge vector includes: inputting the vector representation of the historical dialogue, the knowledge vector, and a word vector of a previously predicted word to a third recurrent neural network, determining a currently predicted word based on a state of a hidden layer of the third recurrent neural network, and performing above operations repeatedly until a complete reply sentence is generated, where: the state of the hidden layer of the third recurrent neural network is unrelated to the processed sentence; and if no previously predicted word exists, a default start symbol is used as the previously predicted word.

According to an embodiment of the present disclosure, the third recurrent neural network may also be called a decoder recurrent neural network, and is configured to generate a reply sentence based on the vector representation of the historical dialogue and the knowledge vector. The neural network may initialize the hidden layer every time a new sentence to be processed is processed, so that the output is not interfered by the processed sentence.

According to an embodiment of the present disclosure, the method first inputs a splicing of the default start symbol, the vector representation of the historical dialogue, and the knowledge vector to the third recurrent neural network, and updates a state of a hidden layer of the third recurrent neural network as a word vector of a first word of the reply sentence; then inputs a splicing of the word vector of the first word of the reply sentence, the vector representation of the historical dialogue, and the knowledge vector to the third recurrent neural network, and updates the state of the hidden layer of the third recurrent neural network as a word vector of a second word of the reply sentence; ... and so on, until all word vectors in the reply sentence are generated, and the word vectors are converted into natural language to generate the reply sentence.

Figure 5:
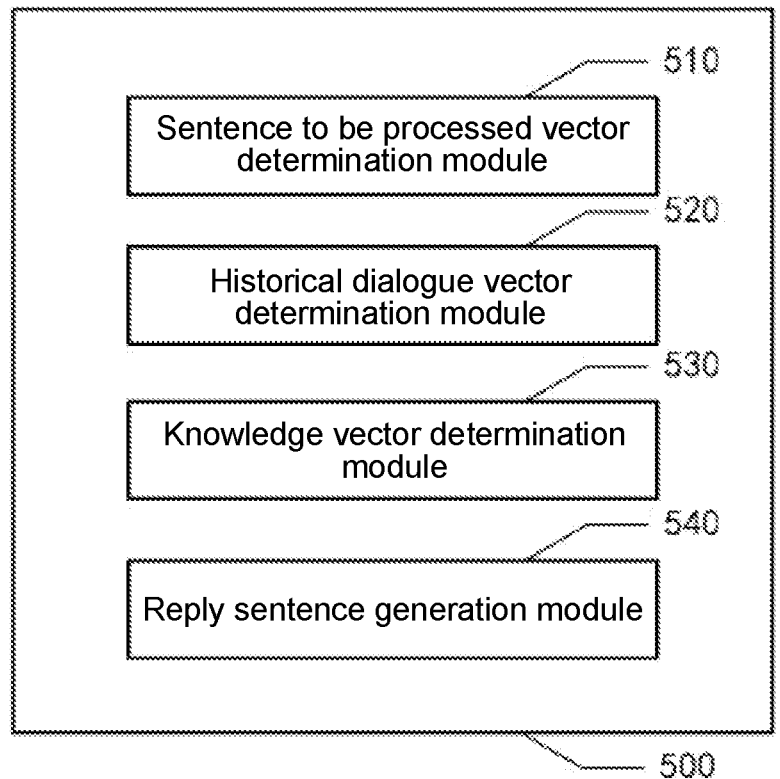
FIG. 5 schematically shows a block diagram of a system for processing sentence according to an embodiment of the present disclosure.

FIG. 5 schematically shows a block diagram of a system for processing sentence 500 according to an embodiment of the present disclosure.

As shown in FIG. 5, the system for processing sentence 500 includes a sentence to be processed vector determination module 510, a historical dialogue vector determination module 520, a knowledge vector determination module 530, and a reply sentence generation module 540.

The sentence to be processed vector determination module 510, for example, performs operation S210 described above with reference to FIG. 2, for determining the vector representation of the sentence to be processed.

The historical dialogue vector determination module 520, for example, performs operation S220 described above with reference to FIG. 2, for inputting the vector representation of the sentence to be processed to the first recurrent neural network, and updating the state of the hidden layer of the first recurrent neural network as a vector representation of the historical dialogue, where, if a processed sentence exists, the state of the hidden layer of the first recurrent neural network is related to the processed sentence.

The knowledge vector determination module 530, for example, performs the operation S230 described above with reference to FIG. 2, for determining the knowledge vector related to the sentence to be processed.

The reply sentence generation module 540, for example, performs the operation S240 described above with reference to FIG. 2, for generating a reply sentence based on the vector representation of the historical dialogue and the knowledge vector.

Figure 6:
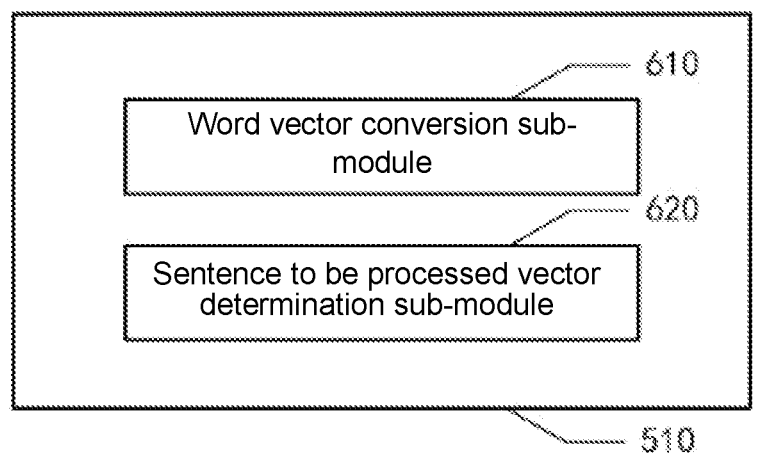
FIG. 6 schematically shows a block diagram of a sentence to be processed vector determination module according to an embodiment of the present disclosure.

FIG. 6 schematically shows a block diagram of the sentence to be processed vector determination module 510 according to an embodiment of the present disclosure.

As shown in FIG. 6, the sentence to be processed vector determination module 510 includes a word vector conversion sub-module 610 and a sentence to be processed vector determination sub-module 620.

The word vector conversion sub-module 610, for example, performs the operation S310 described above with reference to FIG. 3, for converting the words in the sentence to be processed into word vectors.

The sentence to be processed vector determination sub-module 620, for example, performs the operation S320 described above with reference to FIG. 3, for inputting the word vectors to the second recurrent neural network in order, to obtain the state of the hidden layer of the second recurrent neural network as the vector representation of the sentence to be processed, where the state of the hidden layer of the second recurrent neural network is unrelated to the processed sentence.

Figure 7:
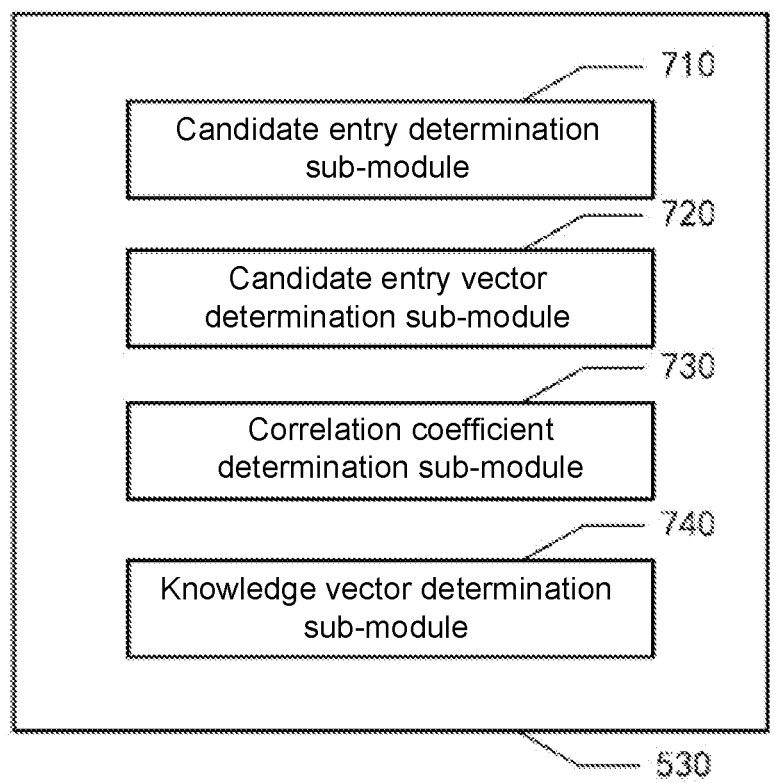
FIG. 7 schematically shows a block diagram of a knowledge vector determination module according to an embodiment of the present disclosure.

FIG. 7 schematically shows a block diagram of the knowledge vector determination module 530 according to an embodiment of the present disclosure.

As shown in FIG. 7, the knowledge vector determination module 530 includes a candidate entry determination sub-module 710, a candidate entry vector determination sub-module 720, a correlation coefficient determination sub-module 730, and a knowledge vector determination sub-module 740.

The candidate entry determination sub-module 710, for example, performs operation S410 described above with reference to FIG. 4, for determining a plurality of candidate entries related to the sentence to be processed.

The candidate entry vector determination sub-module 720, for example, performs operation S420 described above with reference to FIG. 4, for determining a candidate entry vector of the candidate entry.

The correlation coefficient determination sub-module 730, for example, performs operation S430 described above with reference to FIG. 4, for determining a correlation coefficient between each candidate entry vector and the vector representation of the sentence to be processed, or determining a correlation coefficient between each candidate entry vector and the vector representation of the historical dialogue.

The knowledge vector determination sub-module 740, for example, performs operation S440 described above with reference to FIG. 4, for determining the knowledge vector based on the correlation coefficient and the candidate entry vector.

Figure 8:
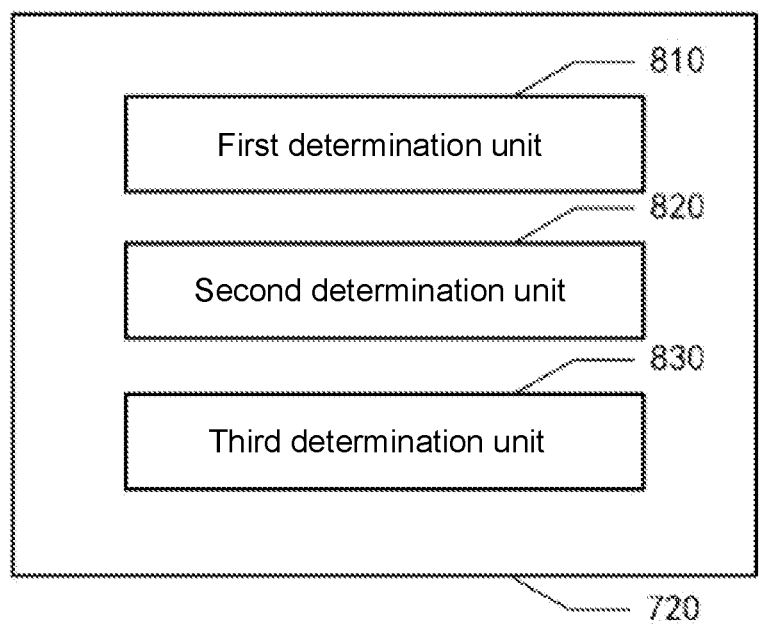
FIG. 8 schematically shows a block diagram of a candidate entry vector determination sub-module according to an embodiment of the present disclosure.

FIG. 8 schematically shows a block diagram of the candidate entry vector determination sub-module 720 according to an embodiment of the present disclosure.

As shown in FIG. 8, the candidate entry determination sub-module 720 includes at least one of a first determination unit 810, a second determination unit 820, or a third determination unit 830.

The first determination unit 810 is configured to determine candidate entries that match the sentence to be processed.

The second determination unit 820 is configured to determine candidate entries that are similar to entity content in the sentence to be processed.

The third determination unit 830 is configured to determine candidate entries related to the processed sentence when the processed sentence exists.

Figure 9:
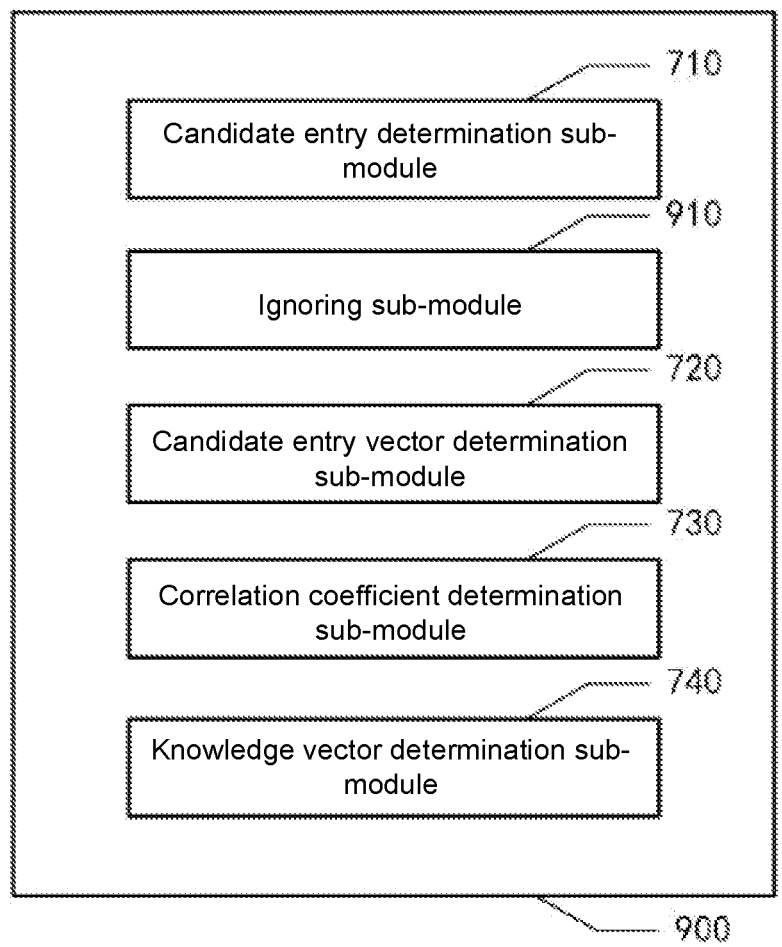
FIG. 9 schematically shows a block diagram of a knowledge vector determination module according to another embodiment of the present disclosure.

FIG. 9 schematically shows a block diagram of a knowledge vector determination module 900 according to another embodiment of the present disclosure.

As shown in FIG. 9, the knowledge vector determination module 900, based on the embodiment shown in FIG. 7, further includes an ignoring sub-module 910, for ignoring a part of the candidate entries in a case that a number of the candidate entries exceeds a preset number.

Figure 10:
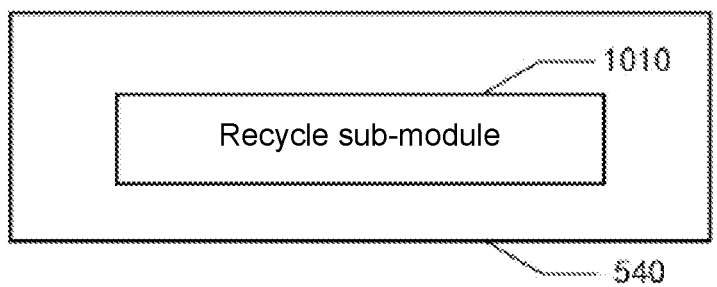
FIG. 10 schematically shows a block diagram of a reply sentence generation module according to an embodiment of the present disclosure.

FIG. 10 schematically shows a block diagram of the reply sentence generation module 540 according to an embodiment of the present disclosure.

As shown in FIG. 10, the reply sentence generation module 540 includes a recycle sub-module 1010, for inputting the vector representation of the historical dialogue, the knowledge vector, and the word vector of the previously predicted word to the third recurrent neural network, and determining the currently predicted word based on the state of the hidden layer of the third recurrent neural network, and performing the above operations repeatedly until a complete reply sentence is generated, where the state of the hidden layer of the third recurrent neural network is unrelated to the processed sentence, and if no previously predicted word exists, a default start symbol is used as the previously predicted word.

According to the embodiments of the present disclosure, any number of the modules, sub-modules, units, and sub-units, or at least part of the functions of any number of them, may be implemented in one module. Any one or more of the modules, sub-modules, units, and sub-units according to the embodiments of the present disclosure may be split into multiple modules for implementation. Any one or more of the modules, sub-modules, units, and sub-units according to the embodiments of the present disclosure may be at least partially implemented as a hardware circuit, such as a field programmable gate array (FPGA), a programmable logic array (PLA), a system-on-chip, a system-on-substrate, a system-on-package, an application-specific integrated circuit (ASIC), or may be implemented by hardware or firmware in any other reasonable way that integrates or encapsulates the circuit, or may be implemented by any one of three implementation manners of software, hardware, and firmware or an appropriate combination of any of them. Alternatively, one or more of the modules, sub-modules, units, and sub-units according to the embodiments of the present disclosure may be at least partially implemented as a computer program module, and the computer program module may perform corresponding functions when it is executed.

For example, any number of the sentence to be processed vector determination module 510, the historical dialogue vector determination module 520, the knowledge vector determination module 530, the reply sentence generation module 540, the word vector conversion sub-module 610, the sentence to be processed vector determination sub-module 620, the candidate entry determination sub-module 710, the candidate entry vector determination sub-module 720, the correlation coefficient determination sub-module 730, the knowledge vector determination sub-module 740, the first determination unit 810, the second determination unit 820, the third determination unit, the ignoring sub-module 910, and the recycle sub-module 1010 may be combined into one module for implementation, or any one of the modules may be split into multiple modules. Alternatively, at least part of the functions of one or more of these modules may be combined with at least part of the functions of other modules and implemented in one module. According to the embodiments of the present disclosure, any one of the sentence to be processed vector determination module 510, the historical dialogue vector determination module 520, the knowledge vector determination module 530, the reply sentence generation module 540, the word vector conversion sub-module 610, the sentence to be processed vector determination sub-module 620, the candidate entry determination sub-module 710, the candidate entry vector determination sub-module 720, the correlation coefficient determination sub-module 730, the knowledge vector determination sub-module 740, the first determination unit 810, the second determination unit 820, the third determination unit, the ignoring sub-module 910, and the recycle sub-module 1010 may be at least partially implemented as a hardware circuit, such as a field programmable gate array (FPGA), a programmable logic array (PLA), a system-on-chip, a system-on-substrate, a system-on-package, an application-specific integrated circuit (ASIC), or may be implemented by hardware or firmware in any other reasonable way that integrates or encapsulates the circuit, or may be implemented by any one of three implementation manners of software, hardware, and firmware or an appropriate combination of any of them. Alternatively, at least one of the sentence to be processed vector determination module 510, the historical dialogue vector determination module 520, the knowledge vector determination module 530, the reply sentence generation module 540, the word vector conversion sub-module 610, the sentence to be processed vector determination sub-module 620, the candidate entry determination sub-module 710, the candidate entry vector determination sub-module 720, the correlation coefficient determination sub-module 730, the knowledge vector determination sub-module 740, the first determination unit 810, the second determination unit 820, the third determination unit, the ignoring sub-module 910, and the recycle sub-module 1010 may be at least partially implemented as a computer program module, and when the computer program module is run, it may perform a corresponding function.

Figure 11:
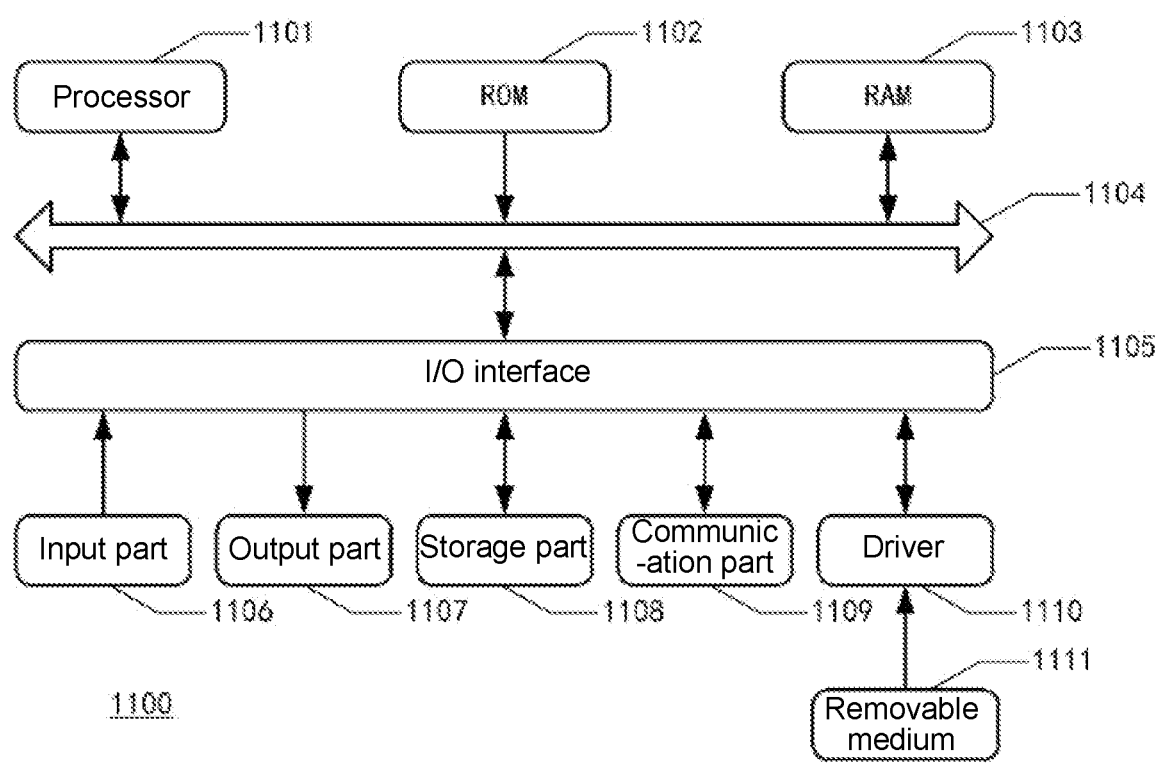
FIG. 11 schematically shows a block diagram of a computer system suitable for implementing a method and a system for processing sentence according to an embodiment of the present disclosure.

FIG. 11 schematically shows a block diagram of a computer system suitable for implementing a method and system for processing sentence according to an embodiment of the present disclosure. The computer system shown in FIG. 11 is only an example, and should not bring any limitation to the function and scope of use of the embodiments of the present disclosure. The computer system shown in FIG. 11 may be implemented as a server cluster, including at least one processor (for example, the processor 1101) and at least one memory (for example, the storage part 1108).

As shown in FIG. 11, a computer system 1100 according to an embodiment of the present disclosure includes a processor 1101, which may execute various appropriate actions and processing according to a program stored in a read only memory (ROM) 1102 or a program loaded into a random access memory (RAM) 1103 from a storage part 1108. The processor 1101 may include, for example, a general-purpose microprocessor (for example, a CPU), an instruction set processor and/or a related chipset and/or a special purpose microprocessor (for example, an application-specific integrated circuit (ASIC)), and so on. The processor 1101 may also include an on-board memory for caching purposes. The processor 1101 may include a single processing unit or multiple processing units for performing different actions of a method flow according to an embodiment of the present disclosure.

In the RAM 1103, various programs and data required for the operation of the system 1100 are stored. The processor 1101, the ROM 1102, and the RAM 1103 are connected to each other through a bus 1104. The processor 1101 executes various operations of the method flow according to the embodiments of the present disclosure by executing programs in the ROM 1102 and/or RAM 1103. It should be noted that the program may also be stored in one or more memories other than ROM 1102 and RAM 1103. The processor 1101 may also execute various operations of the method flow according to the embodiments of the present disclosure by executing programs stored in the one or more memories.

According to an embodiment of the present disclosure, the system 1100 may further include an input/output (I/O) interface 1105, and the input/output (I/O) interface 1105 is also connected to the bus 1104. The system 1100 may also include one or more of the following components connected to the I/O interface 1105: an input part 1106 including a keyboard, a mouse, etc.; an output part 1107 including a cathode ray tube (CRT), a liquid crystal display (LCD), and a speaker, etc.; a storage part 1108 including a hard disk, etc.; and a communication part 1109 including network interface cards such as a LAN card, a modem, and the like. The communication part 1109 performs communication processing via a network such as the Internet. A driver 1110 is also connected to the I/O interface 1105 as needed. A removable medium 1111, such as a magnetic disk, an optical disk, a magneto-optical disk, a semiconductor memory, etc., is installed on the driver 1110 as needed, so that the computer programs read from it are installed into the storage part 1108 as needed.

According to an embodiment of the present disclosure, the method flow according to the embodiment of the present disclosure may be implemented as a computer software program. For example, an embodiment of the present disclosure includes a computer program product, which includes a computer program carried on a computer-readable medium, and the computer program contains program code for executing the method shown in the flowchart. In such an embodiment, the computer program may be downloaded and installed from the network through the communication part 1109, and/or installed from the removable medium 1111. When the computer program is executed by the processor 1101, the above-mentioned functions defined in the system of the embodiment of the present disclosure are executed. According to the embodiments of the present disclosure, the above-described systems, apparatuses, devices, modules, units, etc. may be implemented by computer program modules.

The present disclosure also provides a computer-readable medium. The computer-readable medium may be included in the apparatus/device/system described in the above-mentioned embodiment; or it may exist alone without being assembled into the apparatus/device/system. The above-mentioned computer-readable medium carries one or more programs, and when the above-mentioned one or more programs are executed, the method according to the embodiments of the present disclosure is implemented.

According to an embodiment of the present disclosure, the computer-readable medium may be a computer-readable signal medium or a computer-readable storage medium or any combination of the two. The computer-readable storage medium may be, for example, but not limited to, an electrical, a magnetic, an optical, an electromagnetic, an infrared, or a semiconductor system, device, or element, or any combination of the above. More specific examples of the computer-readable storage medium may include, but not limited to: electrical connections with one or more wires, portable computer disks, hard disks, a random access memory (RAM), a read-only memory (ROM), an erasable programmable read-only memory (EPROM or flash), an optical fiber, a portable compact disk read-only memory (CD-ROM), an optical storage device, a magnetic storage device, or any suitable combination of the above. In the present disclosure, a computer-readable storage medium may be any tangible medium that contains or stores a program, and the program may be used by or in combination with an instruction execution system, device, or element. In the present disclosure, a computer-readable signal medium may include a data signal propagated in a baseband or as a part of a carrier wave, and a computer-readable program code is carried therein. This propagated data signal may take many forms, including but not limited to electromagnetic signals, optical signals, or any suitable combination of the foregoing. The computer-readable signal medium may also be any computer-readable medium other than the computer-readable storage medium. The computer-readable medium may send, propagate, or transmit the program for use by or in combination with the instruction execution system, device, or element. The program code contained on the computer-readable medium may be transmitted by any suitable medium, including but not limited to: wireless, wired, an optical cable, radio frequency signals, etc., or any suitable combination of the foregoing.

For example, according to an embodiment of the present disclosure, the computer-readable medium may include one or more memories other than the ROM 1102 and/or RAM 1103 and/or ROM 1102 and RAM 1103 described above.

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, a program segment, or a part of code, and the above-mentioned module, program segment, or part of code contains one or more executable instructions for realizing the specified logical function. It should also be noted that, in some alternative implementations, the functions marked in the block may also occur in a different order from the order marked in the drawings. For example, two blocks shown in succession may actually be executed substantially in parallel, or they may sometimes be executed in the reverse order, depending on the functions involved. It should also be noted that each block in the block diagram or flowchart, and the combination of blocks in the block diagram or flowchart, may be implemented by a dedicated hardware-based system that performs the specified functions or operations, or may be realized by a combination of dedicated hardware and computer instructions.

Those skilled in the art may understand that the features described in the various embodiments and/or the claims of the present disclosure may be combined and/or grouped in various ways, even if such combinations or groups are not explicitly described in the present disclosure. In particular, without departing from the spirit and teachings of the present disclosure, the features described in the various embodiments and/or the claims of the present disclosure may be combined and/or grouped in various ways. All these combinations and/or groups fall within the scope of the present disclosure.

The embodiments of the present disclosure have been described above. However, these examples are for illustrative purposes only, and are not intended to limit the scope of the present disclosure. Although the respective embodiments are described above, this does not mean that the measures in the respective embodiments may not be advantageously used in combination. The scope of the present disclosure is defined by the appended claims and their equivalents. Without departing from the scope of the present disclosure, those skilled in the art may make various substitutions and modifications, and these substitutions and modifications should fall within the scope of the present disclosure.

What is claimed is:

1. A method for processing sentence, comprising:
    determining a vector representation of a sentence to be processed;
    inputting the vector representation of the sentence to be processed to a first recurrent neural network, and updating a state of a hidden layer of the first recurrent neural network as a vector representation of a historical dialogue, wherein, if a vector representation of another sentence is input to the first recurrent neural network to obtain a processed sentence before inputting the vector representation of the sentence to be processed to the first recurrent neural network-exists, the state of the hidden layer of the first recurrent neural network is related to the processed sentence;
    determining a knowledge vector related to the sentence to be processed; and
    generating a reply sentence based on the vector representation of the historical dialogue and the knowledge vector.

2. The method according to claim 1, wherein the determining a vector representation of the sentence to be processed comprises:
    converting words in the sentence to be processed into word vectors; and
    inputting the word vectors to a second recurrent neural network in order, and obtaining a state of a hidden layer of the second recurrent neural network as a vector representation of the sentence to be processed, wherein the state of the hidden layer of the second recurrent neural network is unrelated to the processed sentence.

3. The method according to claim 1, wherein the determining a knowledge vector related to the sentence to be processed comprises:
    determining a plurality of candidate entries related to the sentence to be processed;
    determining candidate entry vectors of the candidate entries;
    determining a correlation coefficient between each candidate entry vector and the vector representation of the sentence to be processed, or determining a correlation coefficient between each candidate entry vector and the vector representation of the historical dialogue; and
    determining the knowledge vector based on the correlation coefficients and the candidate entry vectors.

4. The method according to claim 3, wherein the determining a plurality of candidate entries related to the sentence to be processed comprises at least one of the following:
    determining candidate entries that match the sentence to be processed;
    determining candidate entries that are similar to entity content in the sentence to be processed; or
    if a processed sentence exists, determining candidate entries related to the processed sentence.

5. The method according to claim 3, further comprising:
    ignoring a part of the candidate entries in a case that a number of the candidate entries exceeds a preset number.

6. The method according to claim 1, wherein the generating a reply sentence based on the vector representation of the historical dialogue and the knowledge vector comprises:
    inputting the vector representation of the historical dialogue, the knowledge vector, and a word vector of a previously predicted word to a third recurrent neural network, determining a currently predicted word based on a state of a hidden layer of the third recurrent neural network, and performing above operations repeatedly until a complete reply sentence is generated, wherein:
    the state of the hidden layer of the third recurrent neural network is unrelated to the processed sentence; and
    if no previously predicted word exists, a default start symbol is used as the previously predicted word.

7. An electronic device comprising:
    one or more processors; and
    a memory configured to store one or more computer programs, which when executed by one or more processors, cause the one or more processors to implement the method according to claim 1.

8. A non-transitory computer-readable medium having executable instructions stored thereon, which when executed by a processor, cause the processor to implement the method according to claim 1.

9. An electronic device comprising:
one or more processors; and
a memory configured to store one or more computer programs, which when executed by one or more processors, cause the one or more processors to implement the method according to claim 2.

10. A non-transitory computer-readable medium having executable instructions stored thereon, which when executed by a processor, cause the processor to implement the method according to claim 2.

11. An electronic device comprising:
one or more processors; and
a memory configured to store one or more computer programs, which when executed by one or more processors, cause the one or more processors to implement the method according to claim 3.

12. A non-transitory computer-readable medium having executable instructions stored thereon, which when executed by a processor, cause the processor to implement the method according to claim 3.

13. An electronic device comprising:
one or more processors; and
a memory configured to store one or more computer programs, which when executed by one or more processors, cause the one or more processors to implement the method according to claim 4.

14. A non-transitory computer-readable medium having executable instructions stored thereon, which when executed by a processor, cause the processor to implement the method according to claim 4.

15. A system for processing sentence, comprising:
a sentence to be processed vector determination module configured to determine a vector representation of a sentence to be processed;
a historical dialogue vector determination module configured to input the vector representation of the sentence to be processed to a first recurrent neural network, and update a state of a hidden layer of the first recurrent neural network as a vector representation of a historical dialogue, wherein, if a vector representation of another sentence is input to the first recurrent neural network to obtain a processed sentence before inputting the vector representation of the sentence to be processed to the first recurrent neural network, the state of the hidden layer of the first recurrent neural network is related to the processed sentence;
a knowledge vector determination module configured to determine a knowledge vector related to the sentence to be processed; and
a reply sentence generation module configured to generate a reply sentence based on the vector representation of the historical dialogue and the knowledge vector.

16. The system according to claim 15, wherein the sentence to be processed vector determination module comprises:
a word vector conversion sub-module configured to convert words in the sentence to be processed into word vectors; and
a sentence to be processed vector determination sub-module configured to input the word vectors into a second recurrent neural network in order, and obtain a state of a hidden layer of the second recurrent neural network as a vector representation of the sentence to be processed, wherein the state of the hidden layer of the second recurrent neural network is unrelated to the processed sentence.

17. The system according to claim 15, wherein the knowledge vector determination module comprises:
a candidate entry determination sub-module configured to determine a plurality of candidate entries related to the sentence to be processed;
a candidate entry vector determination sub-module configured to determine candidate entry vectors of the candidate entries;
a correlation coefficient determination sub-module configured to determine a correlation coefficient between each candidate entry vector and the vector representation of the sentence to be processed, or determine a correlation coefficient between each candidate entry vector and the vector representation of the historical dialogue; and
a knowledge vector determination sub-module configured to determine the knowledge vector based on the correlation coefficients and the candidate entry vectors.

18. The system according to claim 17, wherein the candidate entry determination sub-module comprises at least one of the following:
a first determination unit configured to determine candidate entries that match the sentence to be processed;
a second determination unit configured to determine candidate entries that are similar to entity content in the sentence to be processed; or
a third determination unit configured to that: if a processed sentence exists, determining candidate entries related to the processed sentence.

19. The system according to claim 17, further comprising:
an ignoring sub-module configured to ignore a part of the candidate entries in a case that a number of the candidate entries exceeds a preset number.

20. The system according to claim 15, wherein the reply sentence generation module comprises:
a recycle sub-module configured to input the vector representation of the historical dialogue, the knowledge vector, and a word vector of a previously predicted word to a third recurrent neural network, determine a currently predicted word based on a state of a hidden layer of the third recurrent neural network, and perform above operations repeatedly until a complete reply sentence is generated, wherein:
the state of the hidden layer of the third recurrent neural network is unrelated to the processed sentence; and
if no previously predicted word exists, a default start symbol is used as the previously predicted word.

\* \* \* \* \*